US012583627B2

(12) United States Patent
Mukae

(10) Patent No.: US 12,583,627 B2
(45) Date of Patent: Mar. 24, 2026

(54) HYBRID CONSTELLATION AND FLYING OBJECT MONITORING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 292 days.

(21) Appl. No.: 18/037,094

(22) PCT Filed: Dec. 22, 2020

(86) PCT No.: PCT/JP2020/047936
§ 371 (c)(1),
(2) Date: May 16, 2023

(87) PCT Pub. No.: WO2022/137341
PCT Pub. Date: Jun. 30, 2022

(65) Prior Publication Data
US 2023/0339625 A1 Oct. 26, 2023

(51) Int. Cl.
B64G 1/10 (2006.01)
B64G 1/24 (2006.01)
H04B 7/185 (2006.01)

(52) U.S. Cl.
CPC ......... B64G 1/1085 (2013.01); B64G 1/1021 (2013.01); B64G 1/242 (2013.01); H04B 7/18519 (2013.01)

(58) Field of Classification Search
CPC ...... B64G 1/1085; B64G 1/1007; B64G 1/10; B64G 1/1021; B64G 1/2423;
(Continued)

(56) References Cited

U.S. PATENT DOCUMENTS 5,978,653 A * 11/1999 Taylor .................... H04B 7/195
455/430
6,666,401 B1 * 12/2003 Mardirossian .......... F41G 7/303
244/3.13
(Continued)

FOREIGN PATENT DOCUMENTS

JP 2008-126876 A 6/2008
JP 2008-137439 A 6/2008

OTHER PUBLICATIONS

International Search Report and Written Opinion mailed on Mar. 23, 2021, received for PCT Application PCT/JP2020/047936, filed on Dec. 22, 2020, 8 pages including English Translation.

*Primary Examiner* — Lester G Kincaid
(74) *Attorney, Agent, or Firm* — XSENSUS LLP

(57) ABSTRACT

A satellite constellation (110) includes a plurality of artificial satellites flying on an inclined circular orbit for each of six or more orbital planes having a common orbital inclination and arranged so that south and north axes are mutually shifted in an east-west direction. The plurality of artificial satellites include eight or more artificial satellites for each orbital plane. Each of the artificial satellites includes a fore-and-aft communication device. For each orbital plane, each of the artificial satellites forms a communication network with front and rear artificial satellites by the fore-and-aft communication device. Each of the artificial satellites on each orbital plane crosses southern and northern edges of the orbital plane in synchronization with artificial satellites on other orbital planes, and forms a communication network with that artificial satellites by the fore-and-aft communication device.

13 Claims, 14 Drawing Sheets

100:INCLINED ORBIT SATELLITE SYSTEM

110:SATELLITE CONSTELLATION

(58) Field of Classification Search
　　 CPC ..... B64G 1/2425; B64G 1/242; G01S 19/115;
　　　　　　 G01S 19/33; G01S 2205/01; H04B 7/185;
　　　　　　 H04B 7/18521; H04B 7/19; H04B 7/195
　　 See application file for complete search history.

(56) References Cited

U.S. PATENT DOCUMENTS

| | | | |
|---|---|---|---|
| 7,370,566 B2 * | 5/2008 | Furman ................ | B64G 1/1085 |
| | | | 370/316 |
| 10,637,562 B1 * | 4/2020 | Cleave ............... | H04B 7/18523 |
| 12,355,547 B2 * | 7/2025 | Kaen ........................ | H04B 7/19 |

\* cited by examiner

110:SATELLITE CONSTELLATION

110:SATELLITE CONSTELLATION

Tokyo

110:SATELLITE CONSTELLATION

Fig.10

HYBRID CONSTELLATION AND FLYING OBJECT MONITORING SYSTEM

CROSS-REFERENCE TO RELATED APPLICATIONS

The present application is based on PCT filing PCT/JP2020/047936, filed Dec. 22, 2020, the entire contents of which are incorporated herein by reference.

TECHNICAL FIELD

The present disclosure relates to a satellite constellation for performing data communication.

BACKGROUND ART

A concept of a satellite monitoring system which has many monitoring satellites, has many orbital planes where the plurality of monitoring satellites fly, and continuously monitors a specific area has been known. Also, a concept of a satellite information transmission system for immediately transmitting monitoring information acquired by the satellite monitoring system to any location has been known.

The satellite information transmission system has many communication satellites, and has many orbital planes where the plurality of communication satellites fly. And, each communication satellite forms a communication crosslink between a communication satellite on the same orbital plane and a communication satellite on an adjacent orbital plane, and a mesh communication network is thereby configured.

In this manner, if a monitoring satellite group and a communication satellite group are configured as separate systems, a total cost becomes enormous.

Moreover, to exchange monitoring information acquired at any location between the monitoring satellite group and the communication satellite group, the flying positions of which are changing with time, the transmission plan is complex, requiring efforts.

Thus, the algorithm for optimum communication route search is complex, requiring a long analysis time.

Furthermore, one communication satellite is required to establish communication lines by four communication devices at front, rear, left, and right simultaneously with separate communication devices, which is technically with a high degree of difficulty.

Patent Literature 1 discloses a system which observes an observation target area by using a plurality of observation satellite groups orbiting the earth.

CITATION LIST

Patent Literature

Patent Literature 1: JP 2008-126876

SUMMARY OF INVENTION

Technical Problem

An object of the present disclosure is to allow information to be transmitted to any location by a minimum possible number of artificial satellites.

Solution to Problem

A satellite constellation of the present disclosure includes a plurality of artificial satellites each flying in an inclined circular orbit on six or more orbital planes having a common orbital inclination and arranged so that azimuth components of normal vectors are mutually shifted in an east-west direction.

The plurality of artificial satellites include eight or more artificial satellites for each orbital plane.

Each of the artificial satellites includes a fore-and-aft communication device for communication as directed ahead in a flying direction and behind in the flying direction.

For each orbital plane, each of the artificial satellites forms a communication network with an artificial satellite flying ahead in the flying direction and an artificial satellite flying behind in the flying direction by the fore-and-aft communication device.

Each of the artificial satellites on each orbital plane crosses each of a northern edge of the orbital plane and a southern edge of the orbital plane in synchronization with artificial satellites on other orbital planes; when crossing the northern edge of the orbital plane, forms a communication network with an artificial satellite crossing a northern edge of an adjacent orbital plane, which is an orbital plane adjacent to the orbital plane, by the fore-and-aft communication device; and, when crossing the southern edge of the orbital plane, forms a communication network with an artificial satellite crossing a southern edge of the adjacent orbital plane, by the fore-and-aft communication device.

Advantageous Effects of Invention

According to the present disclosure, information can be transmitted to any location by a minimum possible number of artificial satellites.

BRIEF DESCRIPTION OF DRAWINGS

FIG. 10 is a diagram of structure of the artificial satellite 200 in Embodiment 3.

DESCRIPTION OF EMBODIMENTS

Figure 1:
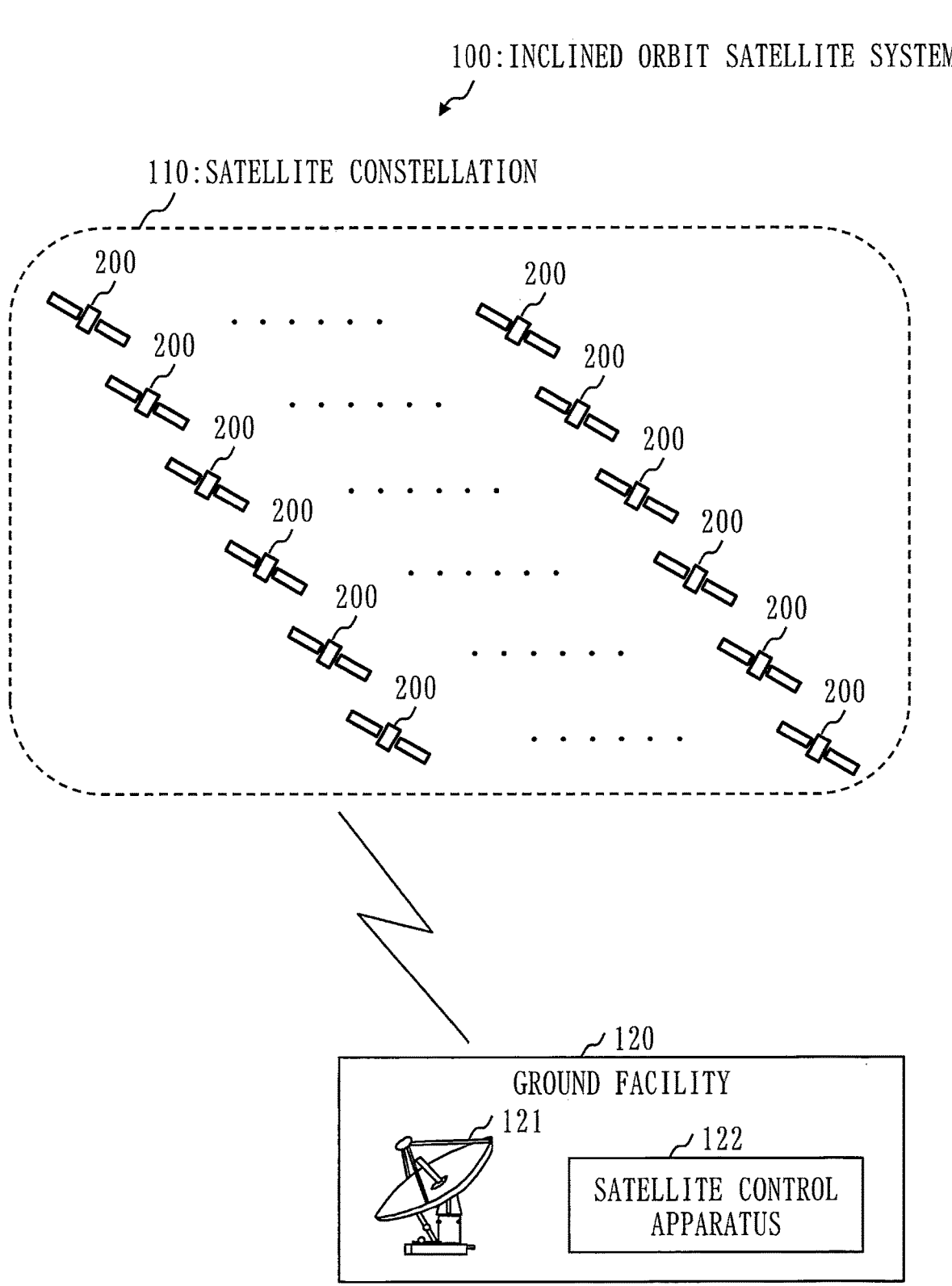
FIG. 1 is a diagram of structure of an inclined orbit satellite system 100 in Embodiment 1.

In the embodiments and the drawings, the same components or corresponding components are provided with the same reference numeral. Description of a component provided with the same reference numeral as that of a described component is omitted or simplified as appropriate.

Embodiment 1

An inclined orbit satellite system 100 is described based on FIG. 1 to FIG. 6.

Description of Structure

Based on FIG. 1, the structure of the inclined orbit satellite system 100 is described.

The inclined orbit satellite system 100 includes a satellite constellation 110 and a ground facility 120.

The satellite constellation 110 includes a plurality of artificial satellites 200.

The plurality of artificial satellites 200 each fly in an inclined circular orbit on any of six or more orbital planes.

The inclined circular orbit is an inclined orbit and also a circular orbit. The artificial satellites 200 flying in the inclined orbit is also referred to as an "inclined orbit satellite".

The six or more orbital planes have a common orbital inclination and are arranged so that azimuth components of normal vectors of the orbital planes are mutually shifted in an east-west direction.

On each orbital plane, the orbital inclination has an angle equal to or larger than 40 degrees and equal to or smaller than 60 degrees.

The orbital inclination is an elevation component of the normal vector of an orbital plane.

The plurality of artificial satellites 200 include eight or more artificial satellites 200 for each orbital plane.

For example, when eight artificial satellites 200 fly on each of the six orbital planes, the satellite constellation 110 includes forty-eight artificial satellites 200.

Figure 2:
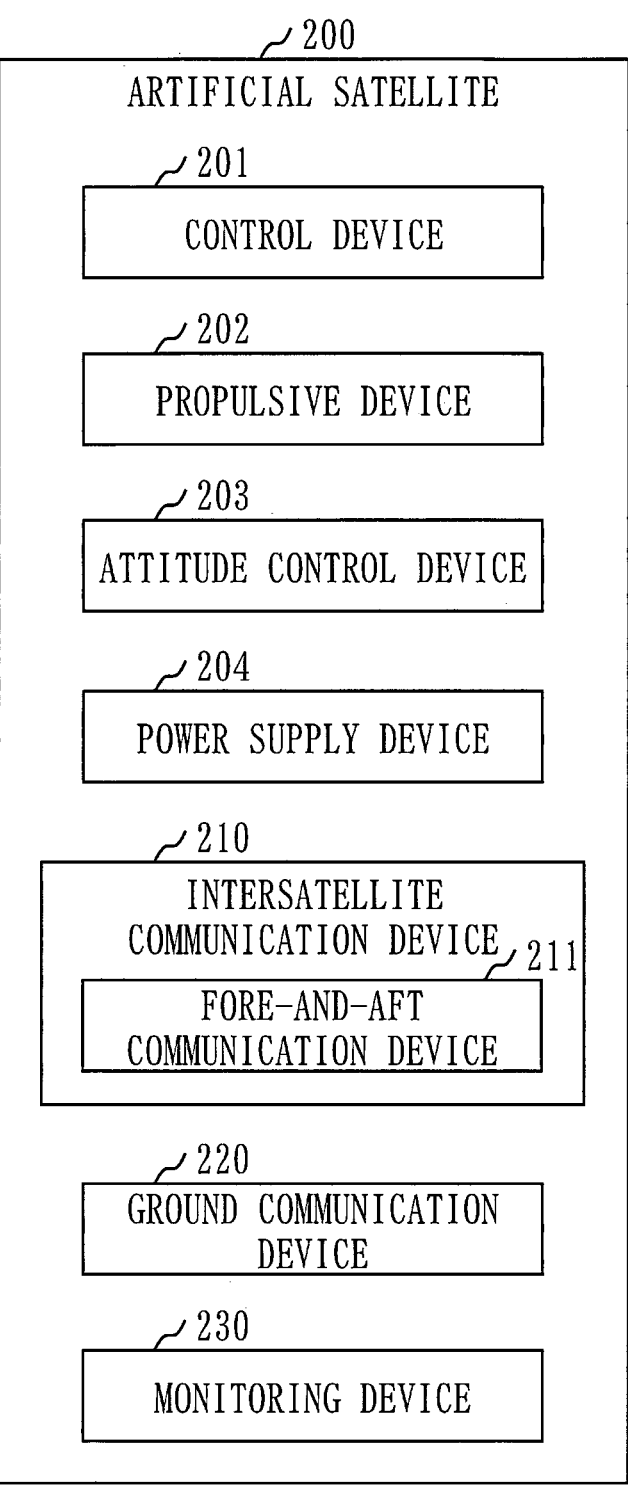
FIG. 2 is a diagram of structure of an artificial satellite 200 in Embodiment 1.

Based on FIG. 2, the structure of the artificial satellite 200 is described.

The artificial satellite 200 includes a control device 201, a propulsive device 202, an attitude control device 203, a power supply device 204, an intersatellite communication device 210, a ground communication device 220, and a monitoring device 230.

The artificial satellite 200 including the monitoring device 230 is also referred to as a "monitoring satellite".

The control device 201 is a computer for controlling each device of the artificial satellite 200.

By following various instruction signals from the ground facility 120, the control device 201 controls each of the propulsive device 202, the intersatellite communication device 210, the ground communication device 220, and the monitoring device 230.

The propulsive device 202 is a device which provides propulsion to the artificial satellite 200, changing the speed of the artificial satellite 200.

Specifically, the propulsive device 202 is a chemical propulsor or electrical propulsor. For example, the propulsive device 202 is a two-liquid thruster, ion engine, or Hall thruster.

The attitude control device 203 is a device for controlling an attitude component of the artificial satellite 200.

The attitude control device 203 changes attitude components of the artificial satellite 200 to a desired direction. Alternatively, the attitude control device 203 maintains attitude components of the artificial satellite 200 in a desired direction.

Specifically, the attitude components of the artificial satellite 200 are the attitude of the artificial satellite 200, the angular velocity of the artificial satellite 200, and the line-of-sight direction of the monitoring device 230.

The attitude control device 203 includes an attitude sensor, an actuator, and a controller. The attitude sensor is a gyroscope, earth sensor, solar sensor, star tracker, thruster, magnetic sensor, or the like. The actuator is an attitude control thruster, momentum wheel, reaction wheel, control moment gyro, or the like. The controller controls the actuator by executing a control program, based on measurement data acquired by the attitude sensor or by following an instruction signal from the ground facility 120.

The power supply device 204 includes a solar cell, a battery, a power control device, or the like, supplying power to each device of the artificial satellite 200.

The intersatellite communication device 210 is a device for communicating with another artificial satellite 200, and includes a fore-and-aft communication device 211.

The fore-and-aft communication device 211 is a device directed ahead in a flying direction and behind in the flying direction for communication in the flying direction of the artificial satellite 200.

The communication device includes a transmitter and a receiver.

The ground communication device 220 is a device for communicating with the ground. Specifically, the ground communication device 220 communicates with the ground facility 120.

The monitoring device 230 is a device for monitoring an observation target. Specifically, the monitoring device 230 is an infrared monitoring device. The infrared monitoring device is a monitoring device using infrared rays.

The observation target is a space object, flying object launched from the ground, or the like. The space object is an object flying in space.

The control device 201 is supplementally described.

The control device 201 includes a processing circuitry.

The processing circuitry may be dedicated hardware or a processor which executes a program stored in a memory.

In the processing circuitry, part of the functions may be implemented by dedicated hardware and the remaining functions may be implemented by software or firmware. That is, the processing circuitry can be implemented by hardware, software, firmware, or a combination of these.

The dedicated hardware is, for example, a single circuit, composite circuit, programmed processor, parallel-programmed processor, ASIC, FPGA, or a combination of these.

ASIC is an abbreviation of Application Specific Integrated Circuit.

FPGA is an abbreviation of Field Programmable Gate Array.

The artificial satellite 200 is supplementally described.

The artificial satellite 200 has a pointing function for orienting a monitoring direction to a monitoring target.

For example, the artificial satellite 200 includes a reaction wheel. The reaction wheel is a device for controlling the attitude of the artificial satellite 200. By the reaction wheel, the attitude of the artificial satellite 200 is controlled to achieve body pointing.

For example, the monitoring device 230 includes a pointing mechanism. The pointing mechanism is a mechanism for changing the line-of-sight direction of the artificial satellite 200. For the pointing mechanism, for example, a driving mirror or the like is used.

Referring back to FIG. 1, the ground facility 120 is described.

The ground facility 120 is a facility provided to the ground. Specifically, the ground facility 120 is provided in a range at 40 degrees north latitude or higher and 60 degrees north latitude or lower or a range at 40 degrees south latitude or higher and 60 degrees south latitude or lower.

The ground facility 120 includes a satellite communication apparatus 121 and a satellite control apparatus 122.

The satellite communication apparatus 121 is an apparatus for communicating with each artificial satellite 200.

The satellite control apparatus 122 is an apparatus for controlling each artificial satellite 200, and generates various instruction signals.

Various instruction signals include an instruction signal for making an instruction for communication, an instruction signal for making an instruction for monitoring, an instruction signal for making an instruction for changing the phase in the orbital plane, and so forth.

As with the control device 201 of the artificial satellite 200, the satellite control apparatus 122 includes a processing circuitry.

Description of Operation

Figure 3:
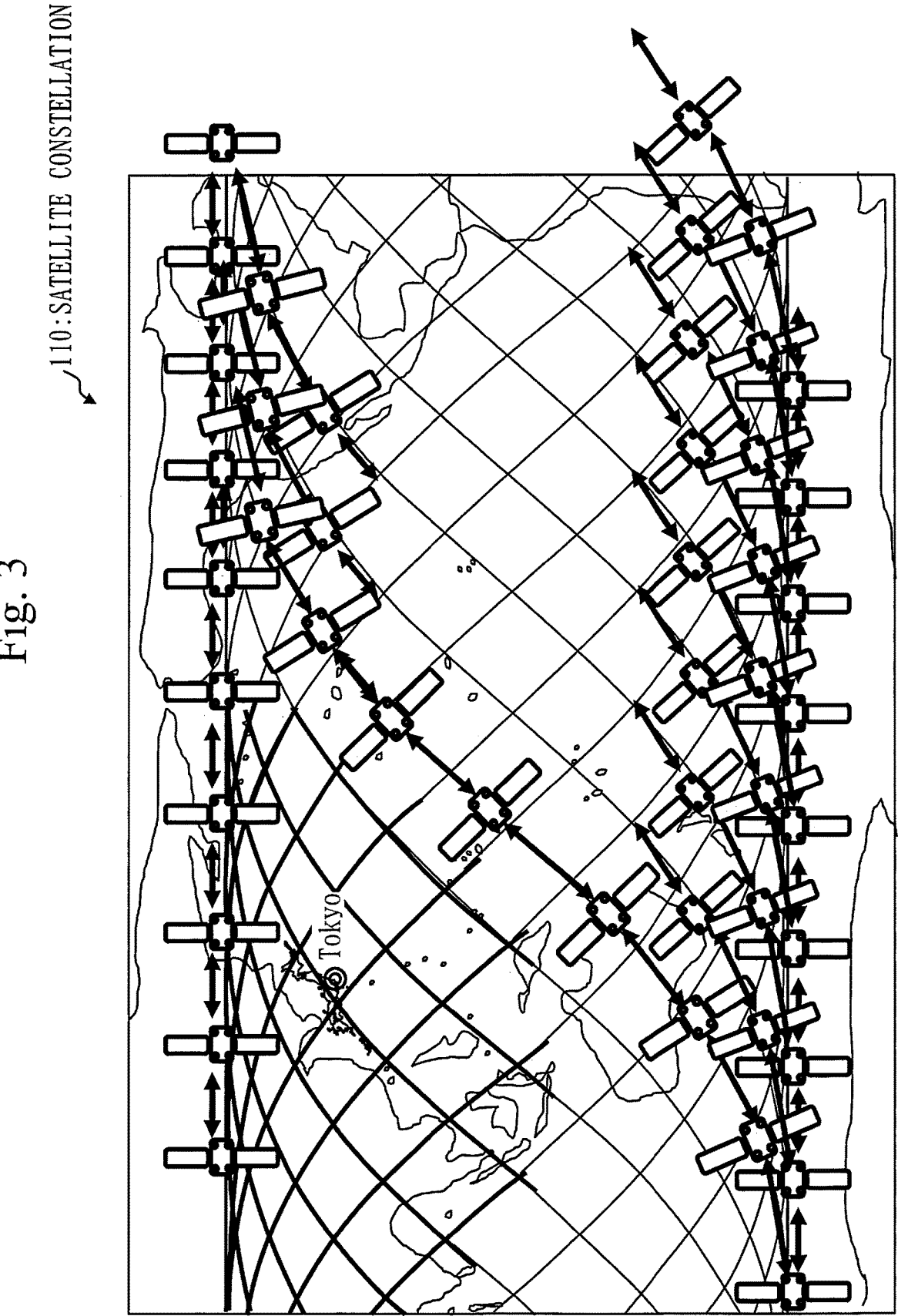
FIG. 3 is a schematic diagram of the entirety of a satellite constellation 110 in Embodiment 1.
Figure 4:
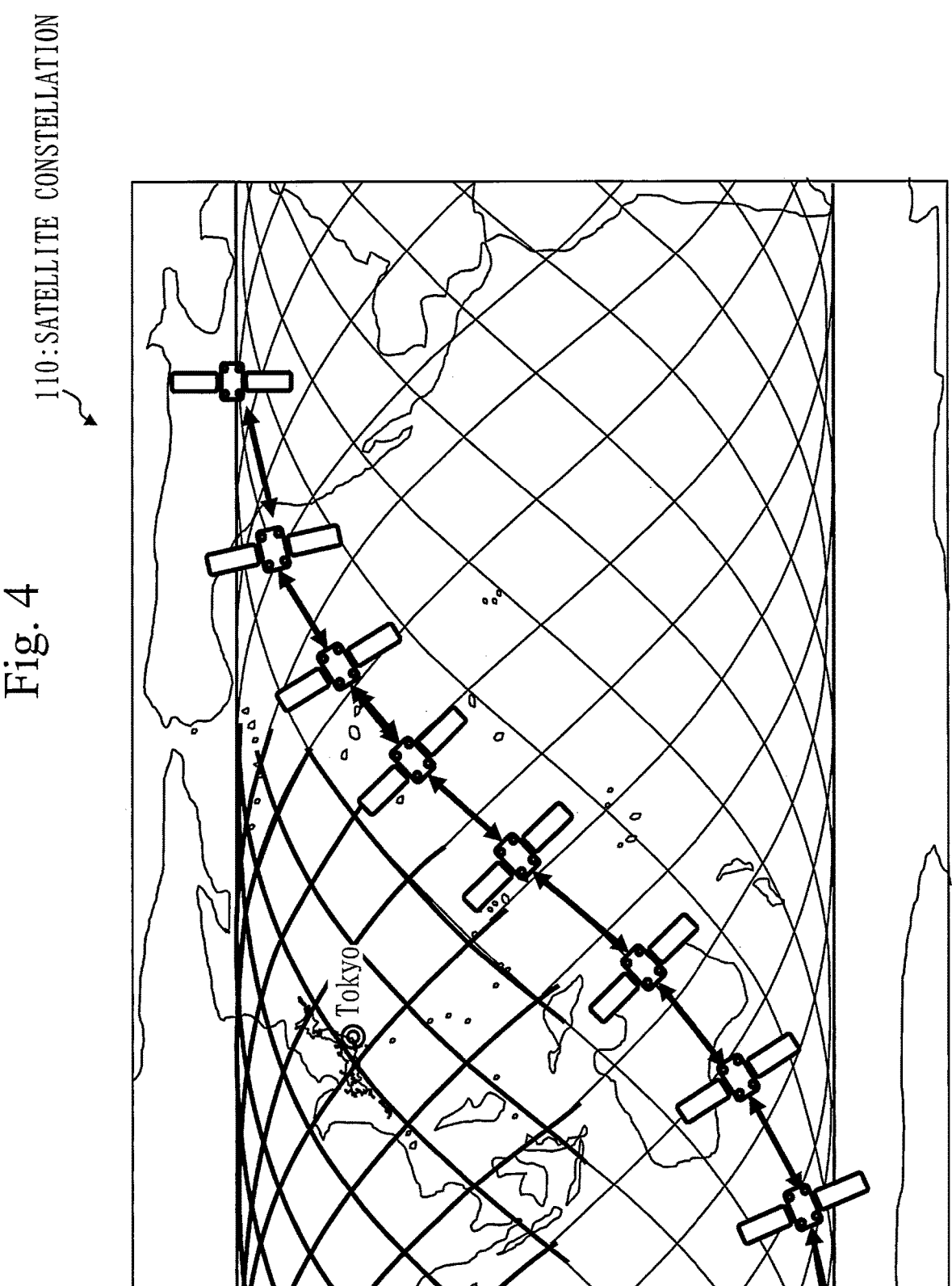
FIG. 4 is a schematic diagram of part of the satellite constellation 110 in Embodiment 1.
Figure 5:
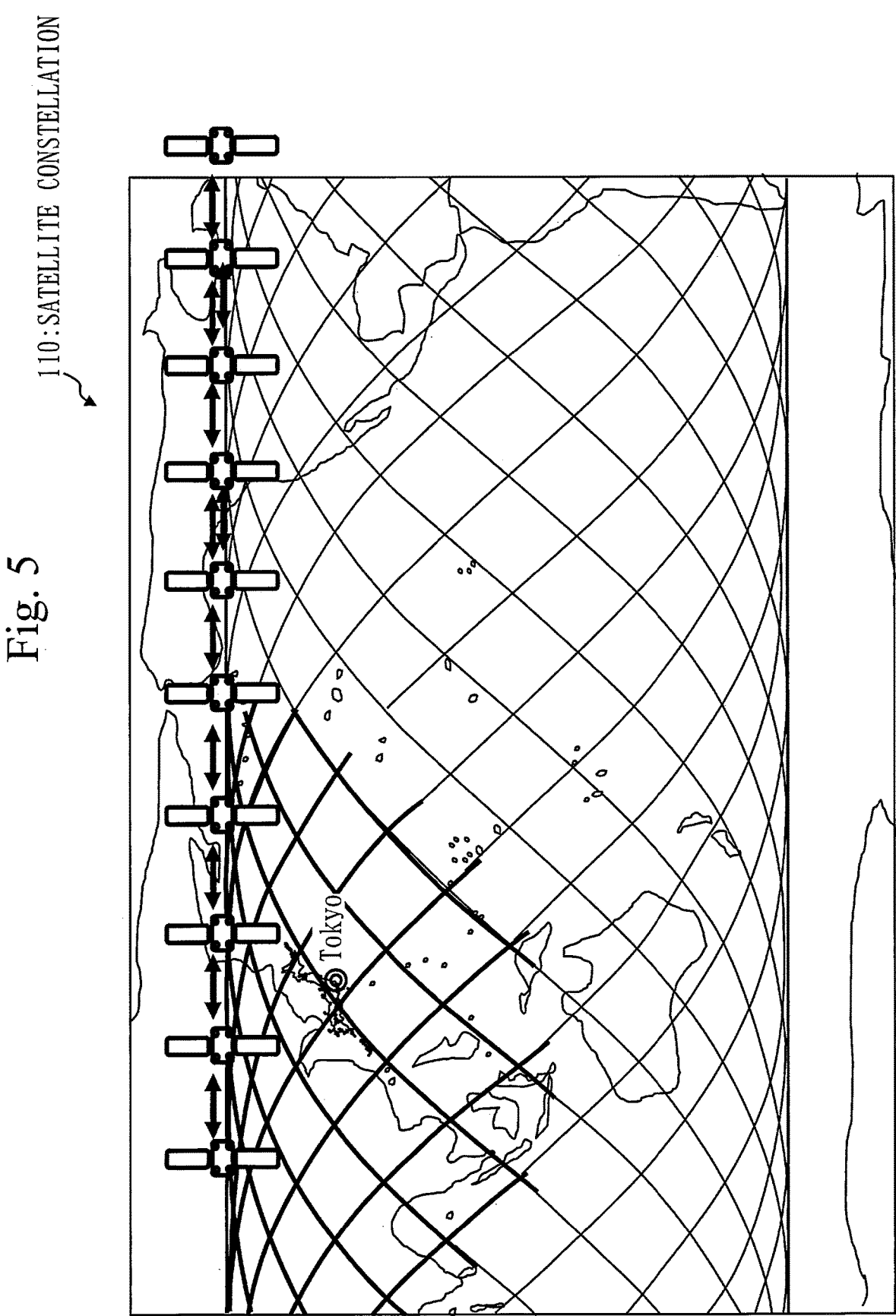
FIG. 5 is a schematic diagram of part of the satellite constellation 110 in Embodiment 1.

Based on FIG. 3 to FIG. 5, the operation of the satellite constellation 110 is described.

Each curve illustrated on a map represents an orbit on each orbital plane.

Each object in each orbit represents the artificial satellite 200.

Arrows between the artificial satellites 200 represent a communication between the artificial satellites 200.

Note that part of the artificial satellites 200 are illustrated and the reference numerals of the artificial satellites 200 are omitted.

FIG. 3 illustrates the entire operation of the satellite constellation 110.

In the following, the operation of the satellite constellation 110 is described as being divided into operation on each orbital plane, operation at the northern edge of the orbital plane, and operation at the southern edge of the orbital plane.

Based on FIG. 4, operation on each orbital plane is described.

On each orbital plane, each artificial satellite 200 forms a communication network with its front artificial satellite 200 and rear artificial satellite 200 by the fore-and-aft communication device 211. That is, on each orbital plane, each artificial satellite 200 can communicate with its front artificial satellite 200 and rear artificial satellite 200.

The front artificial satellite 200 is the artificial satellite 200 flying ahead in the flying direction on the same orbital plane. That is, the front artificial satellite 200 is the artificial satellite 200 that is adjacent forward in the flying direction among the artificial satellites 200 flying on the same orbital plane.

The back artificial satellite 200 is the artificial satellite 200 flying behind in the flying direction on the same orbital plane. That is, the rear artificial satellite 200 is the artificial satellite 200 that is adjacent rearward in the flying direction among the artificial satellites 200 flying on the same orbital plane.

Based on FIG. 5, operation at a northern edge of the orbital plane is described.

Each artificial satellite 200 on each orbital plane crosses the northern edge of each orbital plane in synchronization with the other artificial satellites 200 on the other orbital planes.

Then, when crossing the northern edge of the orbital plane, each artificial satellite 200 on each orbital plane forms a communication network with the artificial satellites 200 crossing the northern edge of each adjacent orbital plane by the fore-and-aft communication device 211. That is, when crossing the northern edge of the orbital plane, each artificial satellite 200 on each orbital plane can communicate with the artificial satellites 200 crossing the northern edge of each adjacent orbital plane.

The adjacent orbital planes are orbital planes adjacent to each other in the east-west direction.

Figure 6:
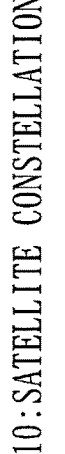
FIG. 6 is a schematic diagram of part of the satellite constellation 110 in Embodiment 1.

Based on FIG. 6, operation at a southern edge of the orbital plane is described.

Each artificial satellite 200 on each orbital plane crosses the southern edge of each orbital plane in synchronization with the other artificial satellites 200 on the other orbital planes.

Then, when crossing the southern edge of the orbital plane, each artificial satellite 200 on each orbital plane forms a communication network with the artificial satellites 200 crossing the southern edge of each adjacent orbital plane by the fore-and-aft communication device 211. That is, when crossing the southern edge of the orbital plane, each artificial satellite 200 on each orbital plane can communicate with the artificial satellites 200 crossing the southern edge of each adjacent orbital plane.

Features of Embodiment 1

The satellite constellation 110 has six or more orbital planes on each of which eight or more artificial satellites 200 each fly in an inclined circular orbit with an orbital inclination of 50±10 deg. Each artificial satellite 200 includes the monitoring device 230 and a communication device. Each artificial satellite 200 includes, as the communication device, the fore-and-aft communication device 211 directed ahead and behind in the flying direction.

The artificial satellites 200 on the same orbital plane each form crosslink communications with the artificial satellites 200 flying ahead and behind to form an annular communication network.

The artificial satellites 200 in the satellite constellation 110 are synchronized so that the artificial satellites 200 on all orbital planes are synchronized at the northernmost edge of the orbital plane and fly at the northernmost edge.

Near the northernmost edge of the orbital plane, the artificial satellites 200 each form crosslink communications with the artificial satellites 200 flying in adjacent orbits by the fore-and-aft communication device 211.

By the annular communication network formed on each orbital plane and communication networks between adjacent orbits at southern and northern edges of the orbital plane, all artificial satellites 200 are connected via the communication networks.

Effects of Embodiment 1

In the inclined circular orbit with an orbital inclination of 50±10 deg, the flying direction in the south-north direction is reversed at the southern and northern edges of the orbital plane. Thus, a situation occurs where the artificial satellite 200 temporarily flies from west to east (a situation where south and north vectors are not included).

Since all artificial satellites 200 fly from west to east at the time of crossing the southern and northern edges of the orbital plane, if phases in the orbital plane where the artificial satellites 200 on its adjacent orbital plane fly are synchronized at the time of crossing the northernmost edge of the orbital plane, it is possible, by the fore-and-aft communication device 211, to form communication cross-links also with the artificial satellites 200 on the adjacent orbital planes.

According to Embodiment 1, monitoring and communication can be achieved by one set of the satellite constellation 110. Also, communications between adjacent orbits can be made only with the fore-and-aft communication device 211. Thus, it is possible to achieve a system having a less total number of satellites and capable of continuously monitoring a specific area at low cost.

Also, complex information exchange is not required in observation and communication, an optimum communication route search is facilitated, and communication can be made in a short time.

Furthermore, since it is not required for one artificial satellite 200 to simultaneously establish and maintain four communication lines, complex technologies with a high degree of difficulty are not required.

In the inclined circular orbit with an orbital inclination of $50\pm10$ deg, the flying direction in the south-north direction is reversed at the southern and northern edges of the orbital plane. Thus, a situation occurs where the artificial satellite 200 temporarily flies from west to east. And, above the area at $50\pm10$ deg latitude on the ground surface, a satellite congestion zone is formed in which the satellite group flies from west to east. That is, in the ground facility 120 at $50\pm10$ deg north latitude or $50\pm10$ deg south latitude, a communication crosslink can be formed with the satellite constellation 110 at high frequency.

Supplement to Embodiment 1

At the time of crossing the southern and northern edges of the orbital plane, it goes without saying that a communication field of view is ensured about two axes, that is, an azimuth corresponding to a lateral direction with respect to a satellite forwarding direction and an elevation corresponding to a longitudinal direction with respect to the satellite forwarding direction, in accordance with changes of a satellite relative position.

Description of Example

An example of the inclined orbit satellite system 100 is described.

On each orbital plane, eight or more artificial satellites 200 are arranged with phases equidistantly shifted. That is, eight or more artificial satellites 200 are arranged with a uniform phase in the orbital plane.

The number of orbital planes included in the six or more orbital planes is a multiple of six.

The satellite constellation 110 includes the plurality of artificial satellites 200, the number of which is a multiple of six.

Each of the plurality of artificial satellites 200 orbits in the inclined circular orbit a plurality of times per day.

The plurality of orbital planes corresponding to the plurality of artificial satellites 200 have their normal lines shifted by a uniform angle in an azimuth direction.

The plurality of orbital planes configure one or more orbital plane sets each formed of six orbital planes.

Timings when the six artificial satellites 200 orbit the six orbital planes of each orbital plane set are synchronized.

A timing when the artificial satellite 200 orbiting the first orbital plane of each orbital plane set crosses the northernmost edge of the first orbital plane is synchronized with timings (1) to (5).

(1) Timing when the artificial satellite 200 orbiting the third orbital plane of each orbital plane set passes through a location where the in-plane phase is shifted by plus 120 degrees from the northernmost edge of the third orbital plane.

(2) Timing when the artificial satellite 200 orbiting the fifth orbital plane of each orbital plane set passes through a location where the in-plane phase is shifted by plus 240 degrees from the northernmost edge of the fifth orbital plane.

(3) Timing when the artificial satellite 200 orbiting the fourth orbital plane of each orbital plane set passes through the southernmost edge of the fourth orbital plane.

(4) Timing when the artificial satellite 200 orbiting the sixth orbital plane of each orbital plane set passes through a location where the in-plane phase is shifted by plus 120 degrees from the southernmost edge of the sixth orbital plane.

(5) Timing when the artificial satellite 200 orbiting the second orbital plane of each orbital plane set passes through a location where the in-plane phase is shifted by plus 240 degrees from the southernmost edge of the second orbital plane.

With this, even if only one artificial satellite 200 is present on each orbital plane, the middle-latitude zone can be exhaustively monitored by appropriately selecting an orbital altitude and a field-of-view range of the monitoring device 230.

Also, on one or more orbital plane sets each formed of six orbital planes, timings when the six artificial satellites 200 orbit the six orbital planes of each orbital plane set are synchronized, and the plurality of artificial satellites 200 fly on the respective orbital planes. With this, the plurality of artificial satellites 200 can simultaneously monitor the middle-latitude zone, making stereoscopy possible based on the principle of spatial triangulation.

Also, even if a plurality of flying objects are simultaneously launched, each launch can be detected.

Also, the low-latitude zone near the equator can be exhaustively monitored, producing an effect of spreading the latitudes that can be covered in the middle-latitude zone to a high-latitude side.

The number of orbital planes included in the six or more orbital planes is twelve.

Also, the number of artificial satellites 200 included in the eight or more artificial satellites 200 is eight.

That is, the satellite constellation 110 includes ninety-six artificial satellites 200 in total.

With hundred or less artificial satellites 200, the middle-latitude zone can be exhaustively and continuously monitored, and information about a monitored flying object can be transmitted to the ground facility 120. Therefore, a flying object monitoring system can be achieved at low cost.

Furthermore, in addition to exhaustiveness of the monitoring range and simultaneous monitoring by the plurality of artificial satellites 200, there is an effect in which information acquired by the monitoring device 230 can be immediately transmitted via the annular communication network and the communication networks between adjacent orbits at the southern and northern edges.

The number of artificial satellites 200 included in the eight or more artificial satellites 200 is an odd number.

Since satellite passing timing differs between the northernmost edge of the orbital plane and the southernmost edge of the orbital plane, communication waiting time can be reduced approximately by half.

The number of orbital planes included in the six or more orbital planes is 18.

Also, the number of artificial satellites 200 included in the eight or more artificial satellites 200 is nine.

That is, the satellite constellation 110 includes 162 artificial satellites 200 in total.

The number of satellites capable of making communications between adjacent orbits is increased at the southern and northern edges of the orbital plane, and satellite passing timing differs between the northernmost edge and the southernmost edge. Thus, communication waiting time can be reduced approximately by half and, furthermore, the communication capacity between adjacent orbits is increased.

The fore-and-aft communication device 211 is an optical communication device. The optical communication device performs communications by using lightwaves.

The optical communication device has an effect of large transmission capacity and an effect of being able to be achieved in small size and with light weight. However, mutually-communicating artificial satellites are required to perform directivity control of optical communication beams with high accuracy.

However, in the satellite constellation 110, the relative relation between the front and rear artificial satellites 200 flying on the same orbital plane is substantially maintained. Thus, in the front and rear artificial satellites 200, since directivity fluctuations are small, optical communication can be easily achieved. With this, a communication line in small size and with light weight and large capacity can be achieved.

The fore-and-aft communication device 211 is a radio wave communication device. The radio wave communication device performs communication by using radio waves.

In communication between adjacent orbits, differences between artificial satellites in the relative position and the forwarding direction are large. Thus, radio wave communication is advantageous, in which the communication line is easy to be maintained even with a large-angle fluctuation in the field of view.

If the fore-and-aft communication device 211 is a radio wave communication device, large-capacity communication can be performed while a long communication time is ensured between adjacent orbits at the southern and northern edges of the orbital plane.

Before and after crossing the southern and northern edges of the orbital plane, intersection of orbital planes occurs. Thus, in communication with the artificial satellite 200 in an adjacent orbit, the communication direction is changed with a large angle. Thus, in optical communication, a breakdown of communications is a problem. By contrast, in radio wave communication, communication between adjacent orbits can be continued without an occurrence of a breakdown of communications. As a result, large-capacity communication can be continued without a time for waiting for a flying satellite.

In the radio wave communication device, if radio waves are subjected to spread spectrum and given spread code, communication can also be performed beyond the adjacent orbit by identifying the artificial satellite 200 in a further adjacent orbit.

If an optical communication device is used in the front and rear artificial satellites 200 flying on the same orbital plane with its relative relation substantially maintained and a radio wave communication device is used in communication with the artificial satellite 200 in an adjacent orbit with a large-angle change in the communication direction, communication with an adjacent orbit can also be made while communication on the same orbital plane is maintained.

Embodiment 2

Figure 7:
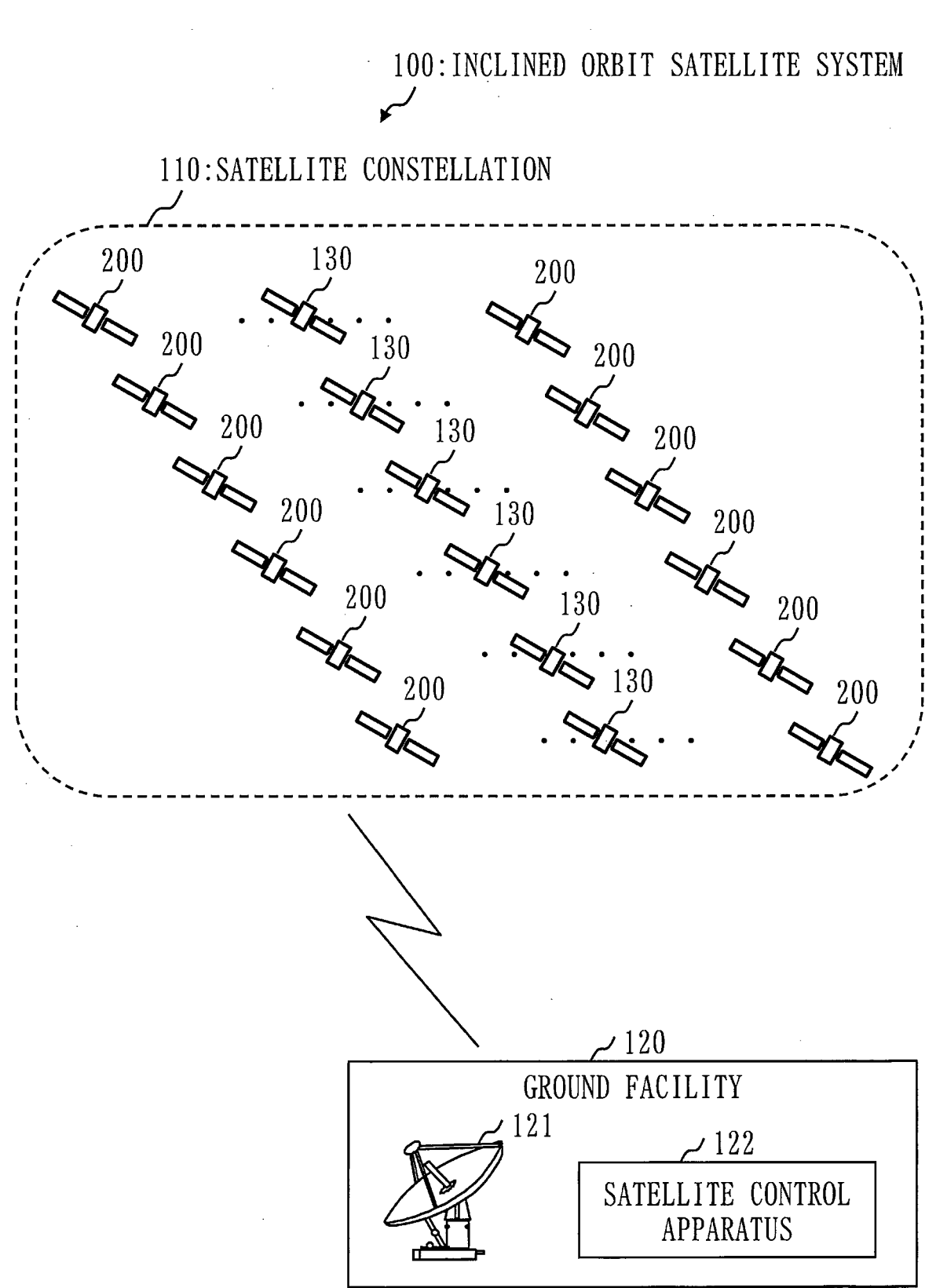
FIG. 7 is a diagram of structure of the inclined orbit satellite system 100 in Embodiment 2.
Figure 8:
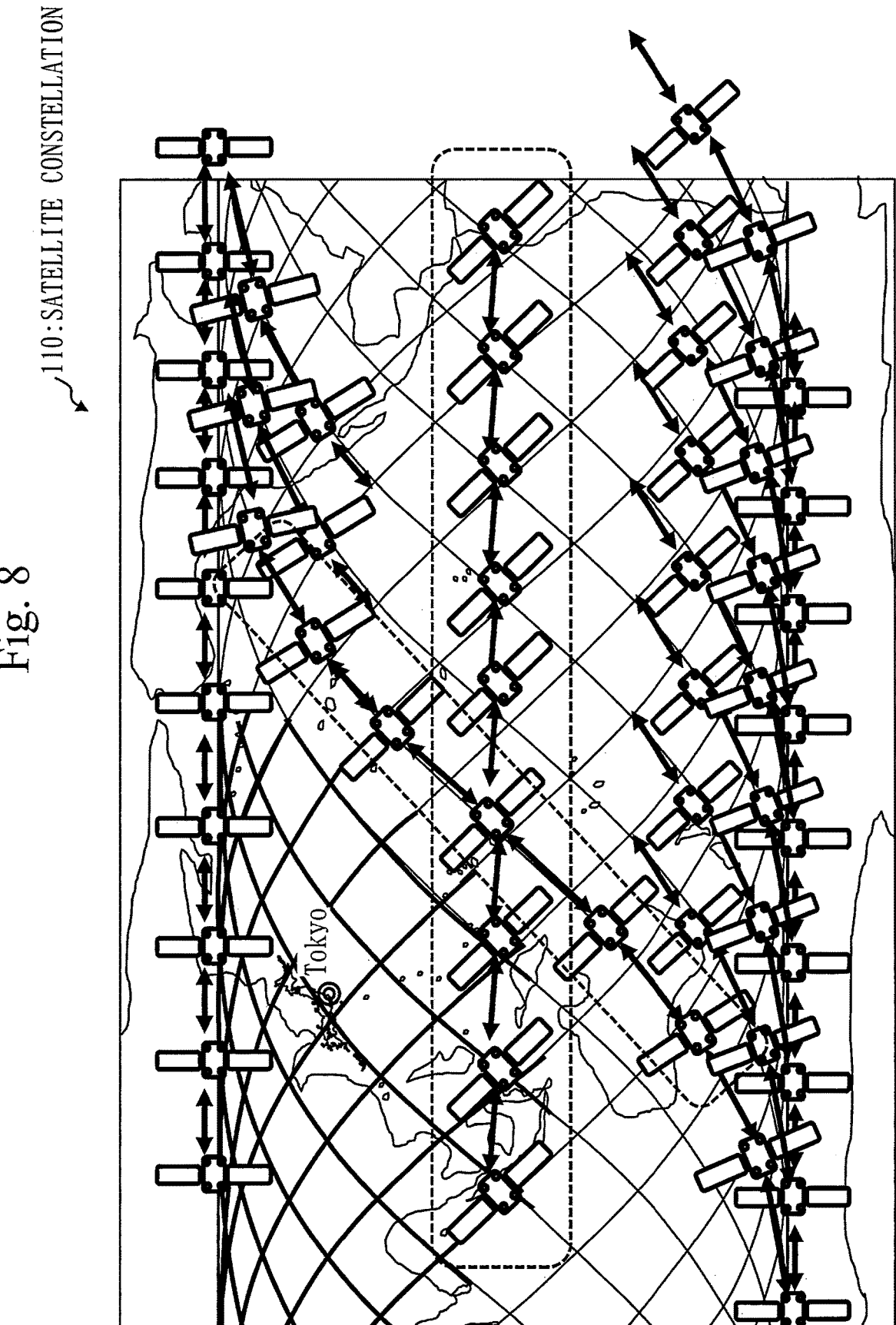
FIG. 8 is a schematic diagram of the entirety of the inclined orbit satellite system 100 in Embodiment 2.

In the inclined orbit satellite system 100, points different from Embodiment 1 are mainly described based on FIG. 7 and FIG. 8.

Description of Structure

Based on FIG. 7, the structure of the inclined orbit satellite system 100 is described.

In the inclined orbit satellite system 100, a communication satellite 130 is newly introduced to each orbital plane. The communication satellite 130 is one type of the artificial satellite 200.

The structure of the communication satellite 130 is similar to the structure of the artificial satellite 200. However, the communication satellite 130 may not include the monitoring device 230.

Description of Operation

After introduction of each communication satellite 130, for each orbital plane, each artificial satellite 200 (including the communication satellite 130) forms a communication network with its front artificial satellite 200 and rear artificial satellite 200 by the fore-and-aft communication device 211.

After introduction of each communication satellite 130, the communication satellite 130 on each orbital plane crosses the northern edge of the orbital plane and the southern edge of the orbital plane in synchronization with the communication satellites 130 on the other orbital planes. Then, when crossing each of the northern edge of the orbital plane and the southern edge of the orbital plane, the communication satellite 130 on each orbital plane forms a communication network with the communication satellite 130 on an adjacent orbital plane by the fore-and-aft communication device 211.

Features of Embodiment 2

The satellite constellation 110 maintains a relative phase between artificial satellites in the orbital plane and synchronization control between artificial satellites between orbital planes.

With the communication satellite 130 added among the artificial satellites on the orbital plane, an annular communication network in the orbital plane is reconstructed.

With the communication satellite 130 added to every orbital plane, all timings of crossing the northernmost edge of the orbital plane are synchronized.

Effects of Embodiment 2

On the same orbital plane, a communication waiting time occurs after the artificial satellite 200 crosses the northernmost edge of the orbital plane until the subsequent artificial satellite 200 flies over the northernmost edge. For example, when ten artificial satellites 200 fly on the same orbital plane and it takes approximately 100 minutes for each artificial satellite 200 to orbit the earth once, a waiting time of ten minutes occurs after the artificial satellite 200 crosses the northernmost edge of the orbital plane until the subsequent artificial satellite 200 flies over the northernmost edge. Even with a wide range of the communication field of view of the fore-and-aft communication device 211 ensured to ensure a communication time on the order of two minutes at the southern and northern edges, a communication waiting time of eight minutes at maximum occurs.

In Embodiment 2, since any number of communication satellites 130 can be introduced, the communication waiting time between adjacent orbits can be reduced. Also, the communication satellite 130 with a single function of communicating with the front and rear artificial satellites 200 can be achieved at low cost.

Description of Example

An example of the inclined orbit satellite system 100 is described.

Each communication satellite 130 includes the fore-and-aft communication device 211 and a left-and-right communication device. The left-and-right communication device is a device for communication as directed leftward in the flying direction and rightward in the flying direction.

After introduction of each communication satellite 130, for each orbital plane, each artificial satellite 200 (including the communication satellite 130) forms a communication network with its front artificial satellite 200 and rear artificial satellite 200 by the fore-and-aft communication device 211.

After introduction of each communication satellite 130, the communication satellite 130 on each orbital plane crosses the northern edge of the orbital plane and the southern edge of the orbital plane in synchronization with the communication satellites 130 on the other orbital planes. Then, when crossing each of the northern edge of the orbital plane and the southern edge of the orbital plane, the communication satellite 130 on each orbital plane forms a communication network with the communication satellite 130 on an adjacent orbital plane by the fore-and-aft communication device 211 and, other than when crossing each of the northern edge of the orbital plane and the southern edge of the orbital plane, forms a communication network with the communication satellite 130 on an adjacent orbital plane by the left-and-right communication device.

Based on FIG. 8, features of the above-described example are described. Each object in an enclosing line represents the communication satellite 130.

The satellite constellation 110 maintains a relative phase between artificial satellite in the orbital plane and synchronization control between artificial satellites between orbital planes.

With the communication satellite 130 added among the artificial satellites on the orbital plane and directed ahead and behind in the flying direction and left and right sidewards, an annular communication network in the orbital plane is reconstructed.

With the communication satellite 130 added to every orbital plane, all timings of crossing the northernmost edge of the orbital plane are synchronized.

The communication satellite 130 forms a crosslink with the communication satellite 130 in an adjacent orbit by the left-and-right communication device.

With this, annular communication networks form a mesh communication network via the left-and-right communication devices, and the communication waiting time between adjacent orbits can be reduced.

Embodiment 3

Figure 9:
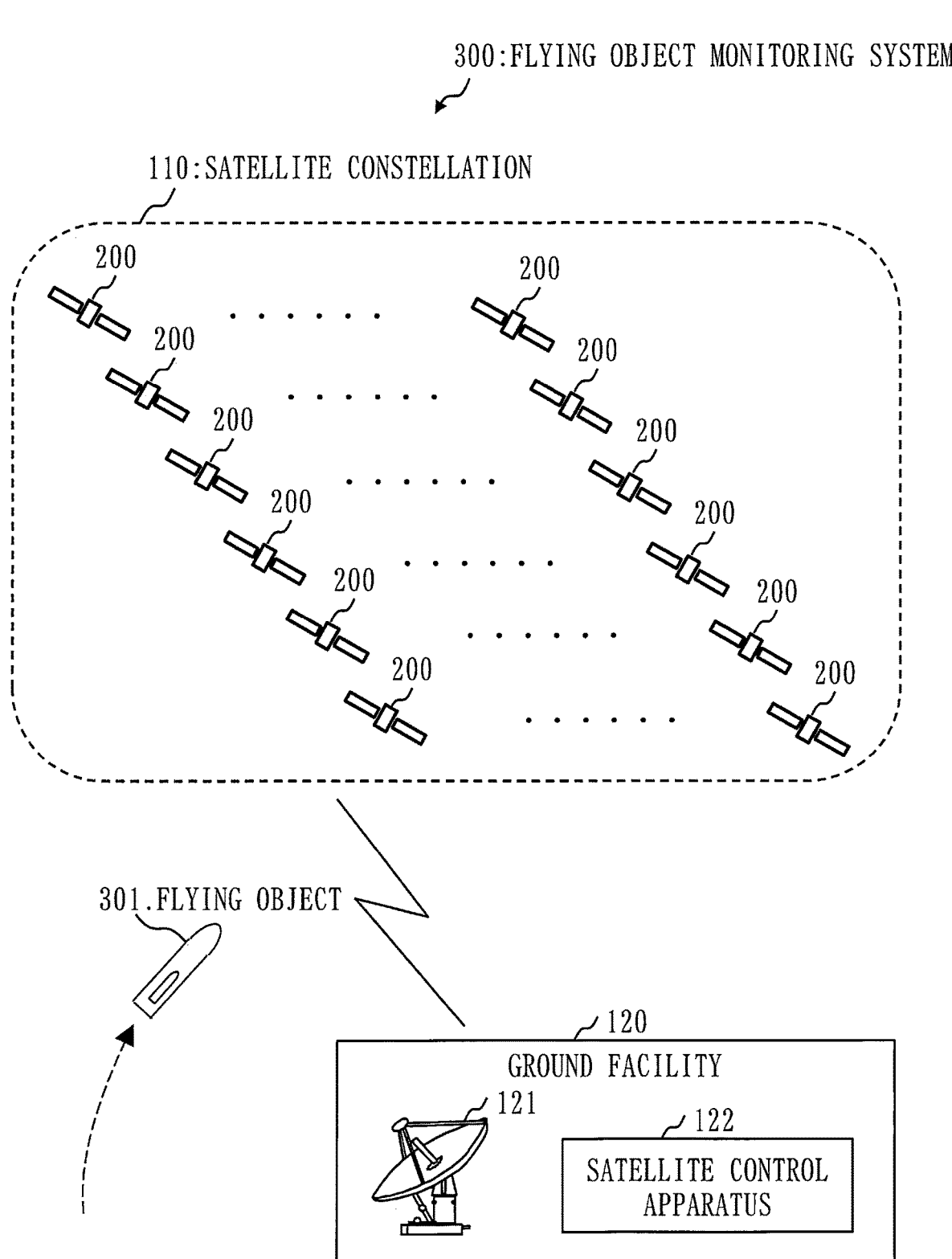
FIG. 9 is a diagram of structure of a flying object monitoring system 300 in Embodiment 3.
Figure 10:
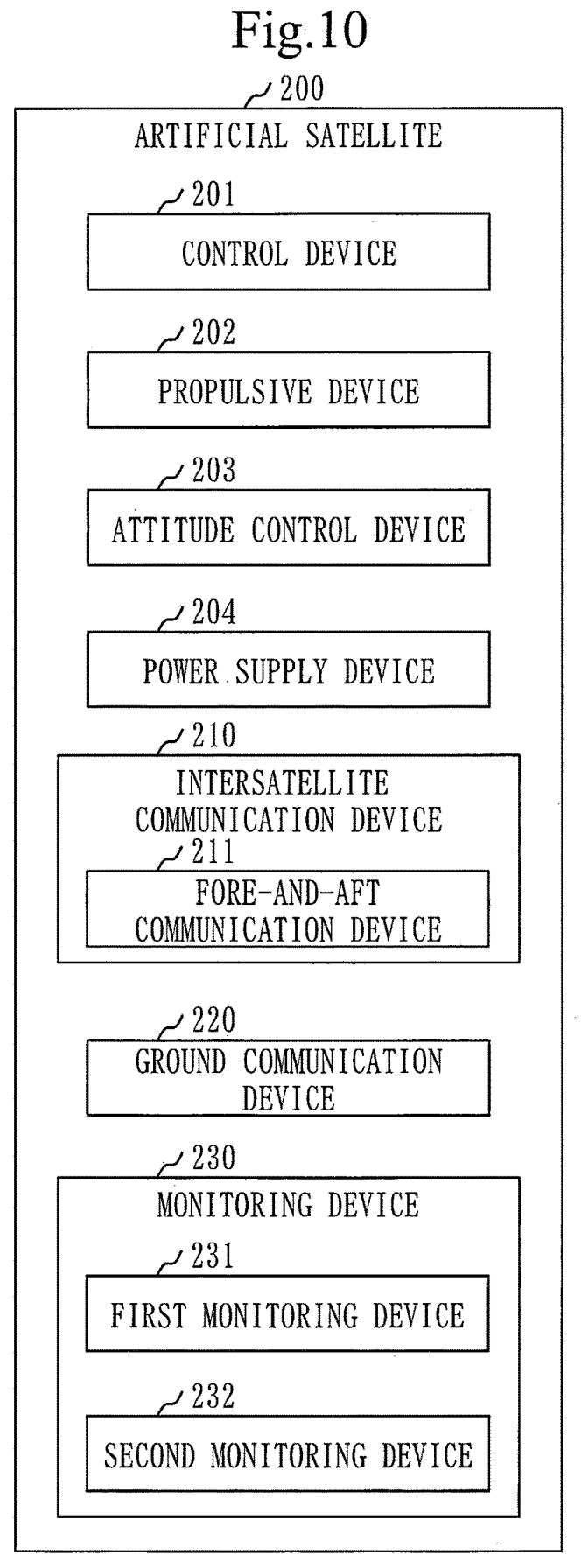

As for a flying object monitoring system 300, points different from Embodiment 1 and Embodiment 2 are mainly described based on FIG. 9 and FIG. 10.

Description of Structure

Based on FIG. 9, the structure of the flying object monitoring system 300 is described.

The flying object monitoring system 300 is the inclined orbit satellite system 100 for monitoring a flying object 301.

The flying object monitoring system 300 includes the satellite constellation 110 and the ground facility 120.

Based on FIG. 10, the structure of the artificial satellite 200 is described.

The artificial satellite 200 includes the monitoring device 230.

The monitoring device 230 includes a first monitoring device 231 and a second monitoring device 232.

The first monitoring device 231 is a monitoring device for detecting a launch of the flying object 301 as directed to a geocentric direction by using infrared rays.

The second monitoring device 232 is a monitoring device for monitoring flying of the flying object 301 as directed to an outer edge of the earth by using infrared rays.

Description of Operation

Each artificial satellite 200 detects a launch of the flying object 301 by the first monitoring device 231 directed to the geocentric direction, and also monitors flying of the flying object 301 by the second monitoring device 232 directed to the outer edge of the earth on the cosmic background. Information and data acquired regarding the flying object 301 by the first monitoring device 231 and the second monitoring device 232 are referred to as "flying object information".

Each artificial satellite 200 transmits flying object information by the fore-and-aft communication device 211 among the artificial satellites. Then, the artificial satellite 200 as a transmission destination transmits the flying object information to the ground facility 120 by the ground communication device 220.

The artificial satellite 200 as a transmission destination is the artificial satellite 200 flying at a location where communication with the ground facility 120 can be made.

Effects of Embodiment 3

The monitoring device 230 monitors a launch of the flying object 301 and the flying object 301 in the course of flying.

That is, when the monitoring target is the flying object 301, launch detection and tracking can be both performed.

In recent years, a flying object called a Hypersonic Glide Vehicle (HGV) has been emerged. After firing at the time of launching, this flying object intermittently fires in the course of flying to change a flight path. Thus, to predict a flight path and an arrival position, it is required to track the temperature-increased main body of the flying object. However, in monitoring by the monitoring device directed to the geocentric direction, the flying object is buried in background noise.

On the other hand, in Embodiment 3, by limb observation, the flying object 301 can be monitored on deep cosmic background. With this, the flying object 301 is not buried in background noise. Thus, the flying object 301 can be tracked.

From Embodiment 3, a launch of the flying object 301 launched from the middle-latitude zone can be detected by the plurality of artificial satellites 200 to derive the position coordinates of the flying object 301.

Also, by unifying flying object information of the second monitoring device 232 performing limb observation, the flying object 301 can be tracked while the position coordinates of the flying object 301 in the course of flying are derived.

Thus, even if the flying object 301 intermittently fires in the course of flying to change the flying direction of the flying object 301, it is possible to track the flying object 301 without losing sight of the flying object 301.

Description of Example

An example of the flying object monitoring system 300 is described.

On each orbital plane, eight or more artificial satellites 200 are arranged with phases equidistantly shifted.

In the satellite constellation 110, by the first monitoring device 231 of each artificial satellite 200, the middle-latitude zone can be continuously monitored with a minimum structure (for example, twelve orbital planes).

Furthermore, since eight or more artificial satellites 200 are disposed on each orbital plane, the flying object 301 can be monitored simultaneously by the plurality of artificial satellites 200. And, the position coordinates of the flying object 301 can be derived by the principle of spatial triangulation.

Also, since the eight or more artificial satellites 200 on the same orbital plane can establish communication links with the front and rear artificial satellites 200, an annular communication network of one orbiting in the orbit can be constructed.

Embodiment 4

The artificial satellite 200 is described based on FIG. 11 to FIG. 14.

Description of Structure

Figure 11:
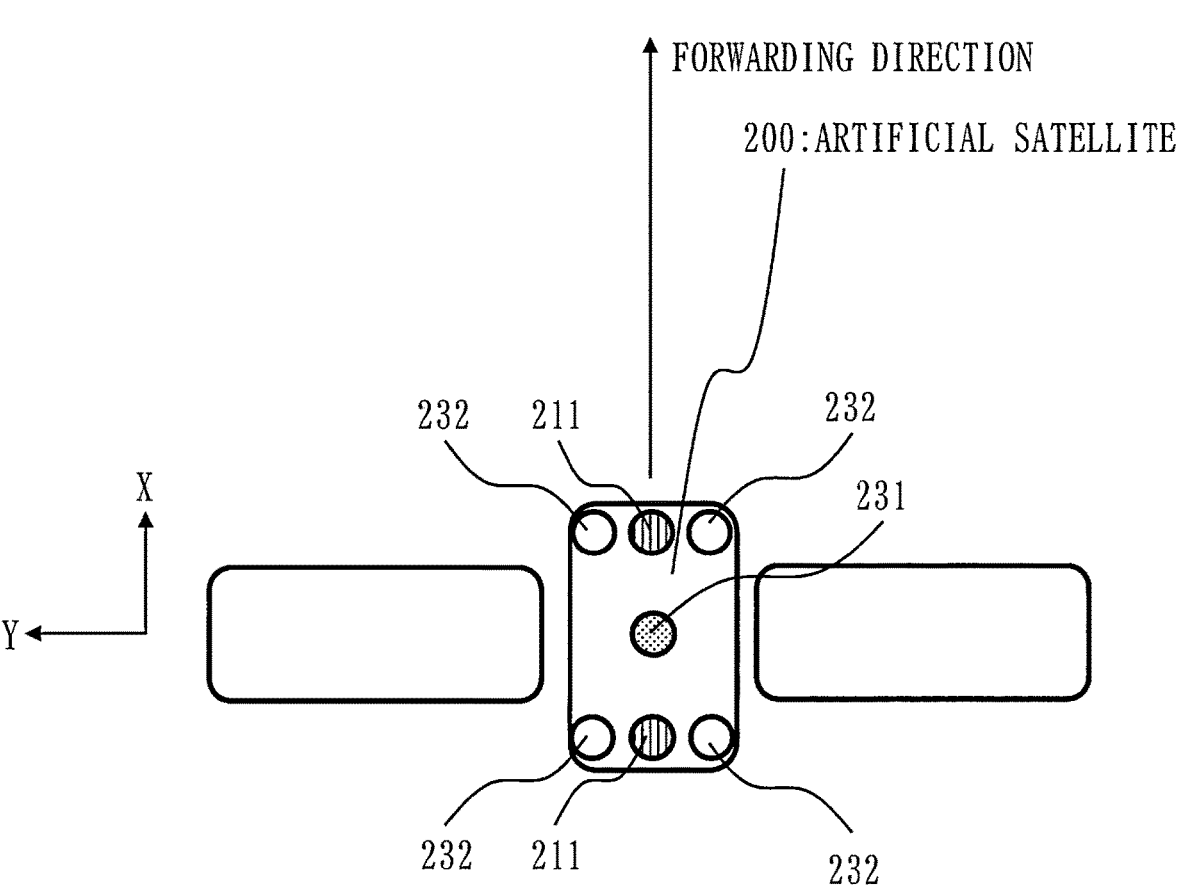
FIG. 11 is a plan view of the artificial satellite 200 in Embodiment 4.
Figure 12:
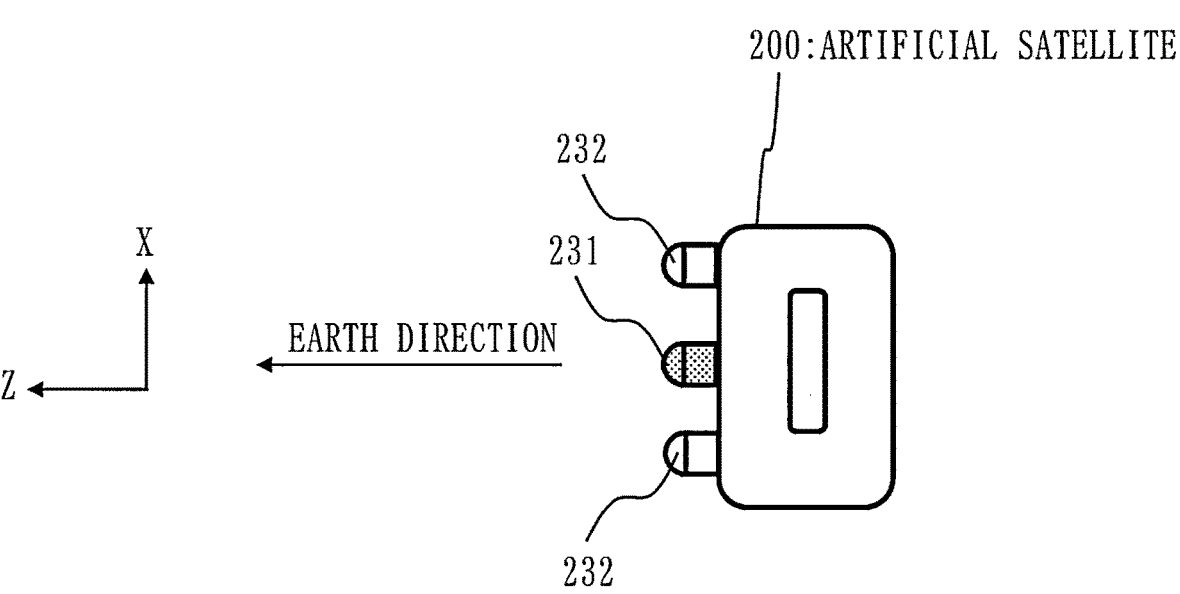
FIG. 12 is a side view of the artificial satellite 200 in Embodiment 4.

Based on FIG. 11 and FIG. 12, the structure of the artificial satellite 200 is described. FIG. 11 is a plan view, and FIG. 12 is a side view.

A forwarding direction, that is, a flying direction, is represented as a plus X axis (+X).

An earth direction, that is, the geocentric direction, is represented as a plus Z axis (+Z).

A direction orthogonal to the forwarding direction and the earth direction is represented as a plus axis (+Y).

The artificial satellite 200 includes the fore-and-aft communication device 211, the first monitoring device 231, and the second monitoring device 232.

The fore-and-aft communication device 211 is configured of a communication device directed ahead and a communication device directed behind.

The second monitoring device 232 is configured of a monitoring device directed rightward ahead, a monitoring device directed leftward ahead, a monitoring device directed rightward behind, and a monitoring device directed leftward behind.

Description of Functions

Figure 13:
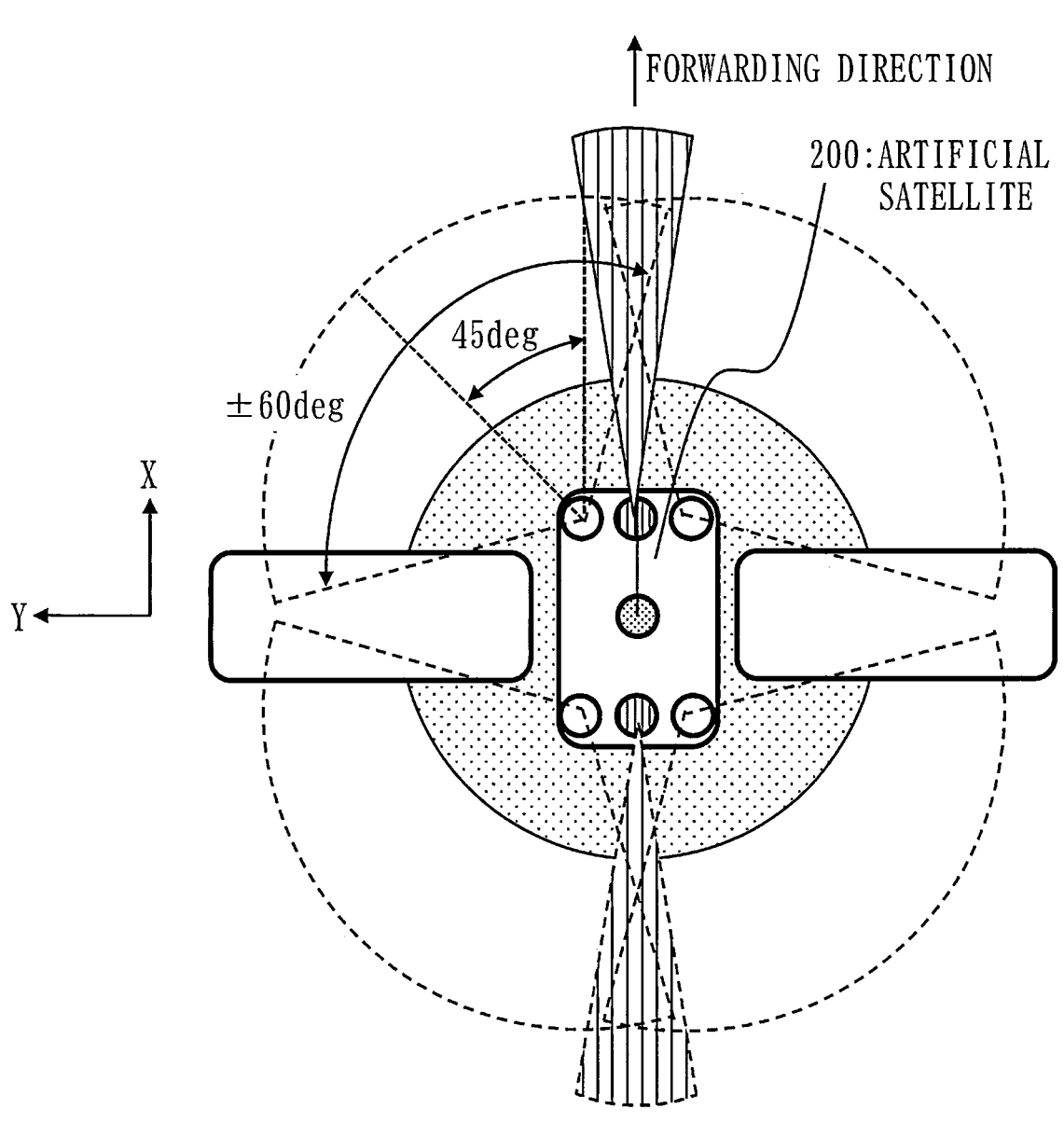
FIG. 13 is a plan view depicting fields of view of the artificial satellite 200 in Embodiment 4.
Figure 14:
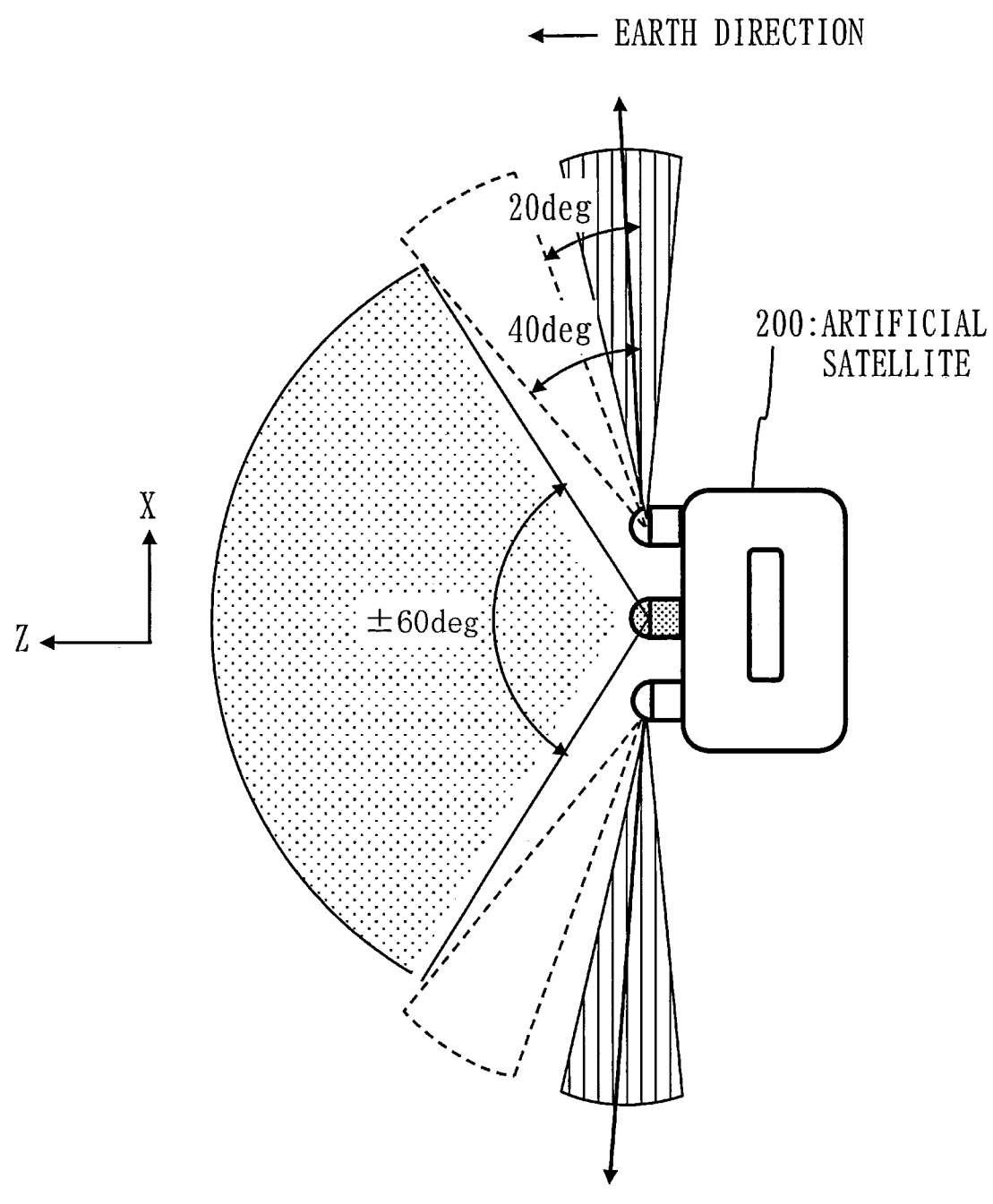
FIG. 14 is a side view depicting the fields of view of the artificial satellite 200 in Embodiment 4.

Based on FIG. 13 and FIG. 14, a communication field of view and a monitoring field of view are described.

Hatched portions with straight lines represent a communication field of view of the fore-and-aft communication device 211.

A dotted portion represents a monitoring field of view of the first monitoring device 231.

Broken lines represent monitoring fields of view of the second monitoring device 232.

The fore-and-aft communication device 211 performs communications as directed to each of a direction represented as +X (ahead) and a direction represented as −X (behind).

The first monitoring device 231 performs monitoring as directed to a direction represented as +Z (downward).

The second monitoring device 232 performs monitoring as directed to each of a direction represented as +X+Y (leftward ahead), a direction represented as +X-Y (rightward ahead), a direction represented as −X+Y (leftward behind), and a direction represented as −X−Y (rightward behind).

The second monitoring device 232 has a field-of-view range of 120 degrees by taking a direction at 45 degrees from the plus X axis to a plus Y axis side (+X+Y) as a center (refer to FIG. 13). Also, the second monitoring device 232 has a field-of-view range from 20 degrees to 40 degrees from the plus X axis to a plus Z axis side (refer to FIG. 14).

The second monitoring device 232 has a field-of-view range of 120 degrees by taking a direction at 45 degrees from the plus X axis to a minus Y axis side (+X−Y) as a center. Also, the second monitoring device 232 has a field-of-view range from 20 degrees to 40 degrees from the plus X axis to a plus Z axis side.

The second monitoring device 232 has a field-of-view range of 120 degrees by taking a direction at 45 degrees from the minus X axis to a plus Y axis side (−X+Y) as a center. Also, the second monitoring device 232 has a field-of-view range from 20 degrees to 40 degrees from the minus X axis to a plus Z axis side.

The second monitoring device 232 has a field-of-view range of 120 degrees by taking a direction at 45 degrees from the minus X axis to a minus Y axis side (−X−Y) as a center. Also, the second monitoring device 232 has a field-of-view range from 20 degrees to 40 degrees from the minus X axis to a plus Z axis side.

Embodiment 5

Application examples are described. Each of the application examples may be combined with any of the others.

Description of Application Example 1

The satellite constellation 110 may be a hybrid constellation.

The hybrid constellation includes a communication constellation and a mission satellite.

The communication constellation includes the plurality of artificial satellites 200 flying on the same orbital plane.

The mission satellite is the artificial satellite 200 performing a specific mission, and is introduced between artificial satellites in the communication constellation.

Each of the plurality of artificial satellites 200 includes the fore-and-aft communication device 211.

The mission satellite includes the fore-and-aft communication device 211 and a mission device. The mission device is a device for performing a specific mission.

In the plurality of artificial satellites 200, each artificial satellite 200 forms a communication network with the artificial satellite 200 ahead in the flying direction and the artificial satellite 200 behind in the flying direction by the fore-and-aft communication device 211. With this, an annular communication network is formed.

After the mission satellite starts flying among the artificial satellites in the communication constellation, the plurality of artificial satellites 200 reconstruct and form the annular communication network including the mission satellite.

From Application Example 1, information other than that regarding communication, specifically, information regarding the mission, can be transmitted on a real-time basis via the annular communication network.

For example, the mission device is a communication device such as an observation device, a measurement device, or an information collecting device. Also, the mission device may be a data relay device, or a communication device for performing communication with various ground assets (including a movable body). Furthermore, the mission device may be a device other than those described above.

Description of Application Example 2

The satellite constellation 110 may be a hybrid constellation.

The hybrid constellation includes a communication constellation and a mission satellite.

The communication constellation includes, for each of a plurality of orbital planes, the plurality of artificial satellites 200 flying on the same orbital plane.

The mission satellite is the artificial satellite 200 performing a specific mission, and is introduced between artificial satellites on any of the plurality of orbital planes.

Each of the plurality of artificial satellites 200 includes the fore-and-aft communication device 211 and the left-and-right communication device 212.

The mission satellite includes the fore-and-aft communication device 211 and a mission device. The mission device is a device for performing a specific mission.

In the communication constellation, for each orbital plane, each artificial satellite 200 forms a communication network with the artificial satellite 200 ahead in the flying direction and the artificial satellite 200 behind in the flying direction by using the fore-and-aft communication device 211. With this, an annular communication network is formed.

On the plurality of orbital planes, each artificial satellite 200 forms a communication network with the artificial satellites 200 on adjacent left and right orbital planes in the flying direction by using the left-and-right communication device 212. With this, a mesh communication network is formed.

After the mission satellite starts flying among the artificial satellites, the communication constellation reconstructs and forms the annular communication network including the mission satellite and also reconstructs and forms the mesh communication network.

From Application Example 2, information transmission of various missions can be made globally and exhaustively.

Also, if the mission device is a monitoring device and flying object information acquired by detecting a launch of the flying object 301 is transmitted via the communication networks formed by the hybrid constellation, the hybrid constellation becomes a flying object monitoring system.

Also, if artificial satellites on different orbital planes are subjected to synchronization control, communications between adjacent orbits at the southern and northern edges of the orbital plane can be made.

Supplement to Embodiments

Each embodiment is an example illustrating a preferred embodiment and is not intended to limit the technical scope of the present disclosure. Each embodiment may be partially implemented or may be implemented in combination with another embodiment.

REFERENCE SIGNS LIST

100: inclined orbit satellite system; 110: satellite constellation; 120: ground facility; 121: satellite communication apparatus; 122: satellite control apparatus; 130: communication satellite; 200: artificial satellite; 201: control device; 202: propulsive device; 203: attitude control device; 204: power supply device; 210: inter-satellite communication device; 211: fore-and-aft communication device; 212: left-and-right communication device; 220: ground communication device; 230: monitoring device; 231: first monitoring device; 232: second monitoring device; 300: flying object monitoring system; 301: flying object

The invention claimed is:

1. A hybrid constellation comprising:
   a communication constellation including a plurality of artificial satellites flying on a same orbital plane for each of a plurality of orbital planes; and
   a mission satellite to be introduced among the artificial satellites on any of the plurality of orbital planes, wherein
   each of the plurality of artificial satellites includes a fore-and-aft communication device for communication as directed ahead in a flying direction and behind in the flying direction,
   the mission satellite includes a fore-and-aft communication device and a mission device, and
   the communication constellation
   forms an annular communication network by each of the artificial satellites forming a communication network with an artificial satellite ahead in the flying direction and an artificial satellite behind in the flying direction by using the fore-and-aft communication device, for each orbital plane
   after the mission satellite starts flying among the artificial satellites, reconstructs and forms the annular communication network including the mission satellite, and
   each of the artificial satellites on each orbital plane crosses each of a northern edge of the orbital plane and a southern edge of the orbital plane in synchronization with artificial satellites on other orbital planes; when crossing the northern edge of the orbital plane, forms a communication network with an artificial satellite crossing a northern edge of an adjacent orbital plane, which is an orbital plane adjacent to the orbital plane, by the fore-and-aft communication device; and, when crossing the southern edge of the orbital plane, forms a communication network with an artificial satellite crossing a southern edge of the adjacent orbital plane, by the fore-and-aft communication device.

2. The hybrid constellation according to claim 1, wherein artificial satellites on different orbital planes are subjected to synchronization control.

3. The hybrid constellation according to claim 1, wherein the orbital inclination has an angle equal to or larger than 40 degrees and equal to or smaller than 60 degrees.

4. The hybrid constellation according to claim 1, wherein the fore-and-aft communication device is an optical communication device.

5. The hybrid constellation according to claim 1, wherein the fore-and-aft communication device is a radio wave communication device.

6. The hybrid constellation according to claim 3, wherein the fore-and-aft communication device is an optical communication device.

7. The hybrid constellation according to claim 3, wherein the fore-and-aft communication device is a radio wave communication device.

8. The hybrid constellation according to claim 1, wherein communications between adjacent orbits are only made with the fore-and-aft communication device.

9. The hybrid constellation according to claim 1, wherein the communication constellation has a communication satellite including the fore-and-aft communication device newly introduced to each orbital plane, and after introduction of each communication satellite, the communication satellite on each orbital plane crosses each of a northern edge of the orbital plane and a southern edge of the orbital plane in synchronization with communication satellites on other orbital planes and, when crossing each of the northern edge of the orbital plane and the southern edge of the orbital plane, forms a communication network with a communication satellite on the adjacent orbital plane by the fore-and-aft communication device.

10. A hybrid constellation comprising:
a communication constellation including a plurality of artificial satellites flying on a same orbital plane for each of a plurality of orbital planes; and
a mission satellite to be introduced among any artificial satellites on any of the plurality of orbital planes, wherein
each of the plurality of artificial satellites includes a fore-and-aft communication device for communication as directed ahead in a flying direction and behind in the flying direction and a left-and-right communication device for communication as directed leftward in the flying direction and rightward in the flying direction,
the mission satellite includes a fore-and-aft communication device and a mission device, and
the communication constellation
forms an annular communication network by each of the artificial satellites forming a communication network with an artificial satellite ahead in the flying direction and an artificial satellite behind in the flying direction by using the fore-and-aft communication device, for each orbital plane,
forms a mesh communication network by each of the artificial satellites forming a communication network with an artificial satellite on an adjacent orbital plane on each of left and right in the flying direction by using the left-and-right communication device, on the plurality of orbital planes,
after the mission satellite starts flying among the artificial satellites, reconstructs and forms the annular communication network including the mission satellite and also reconstructs and forms the mesh communication network, and
each of the artificial satellites on each orbital plane crosses each of a northern edge of the orbital plane and a southern edge of the orbital plane in synchronization with artificial satellites on other orbital planes; when crossing the northern edge of the orbital plane, forms a communication network with an artificial satellite crossing a northern edge of an adjacent orbital plane, which is an orbital plane adjacent to the orbital plane, by the fore-and-aft communication device; and, when crossing the southern edge of the orbital plane, forms a communication network with an artificial satellite crossing a southern edge of the adjacent orbital plane, by the fore-and-aft communication device.

11. The hybrid constellation according to claim 10, wherein
artificial satellites on different orbital planes are subjected to synchronization control.

12. A flying object monitoring system comprising:
a communication constellation including a plurality of artificial satellites flying on a same orbital plane for each of a plurality of orbital planes; and
a monitoring satellite to be introduced among the artificial satellites, wherein
each of the plurality of artificial satellites includes a fore-and-aft communication device for communication as directed ahead in a flying direction and behind in the flying direction,
the monitoring satellite includes a fore-and-aft communication device and a monitoring device, and
the plurality of artificial satellites
form an annular communication network by each of the artificial satellites forming a communication network with an artificial satellite ahead in the flying direction and an artificial satellite behind in the flying direction by using the fore-and-aft communication device, for each orbital plane
after the monitoring satellite starts flying among the artificial satellites, reconstruct and form the annular communication network including the monitoring satellite, and
each of the artificial satellites on each orbital plane crosses each of a northern edge of the orbital plane and a southern edge of the orbital plane in synchronization with artificial satellites on other orbital planes; when crossing the northern edge of the orbital plane, forms a communication network with an artificial satellite crossing a northern edge of an adjacent orbital plane, which is an orbital plane adjacent to the orbital plane, by the fore-and-aft communication device; and, when crossing the southern edge of the orbital plane, forms a communication network with an artificial satellite crossing a southern edge of the adjacent orbital plane, by the fore-and-aft communication device.

13. A flying object monitoring system comprising:
a communication constellation including a plurality of artificial satellites flying on a same orbital plane for each of a plurality of orbital planes; and a monitoring satellite to be introduced among any artificial satellites on any of the plurality of orbital planes, wherein each of the plurality of artificial satellites includes a fore-and-aft communication device for communication as directed ahead in a flying direction and behind in the flying direction and a left-and-right communication device for communication as directed leftward in the flying direction and rightward in the flying direction, the monitoring satellite includes a fore-and-aft communication device and a monitoring device, and the communication constellation forms an annular communication network by each of the artificial satellites forming a communication network with an artificial satellite ahead in the flying direction and an artificial satellite behind in the flying direction by using the fore-and-aft communication device, for each orbital plane, forms a mesh communication network by each of the artificial satellites forming a communication network with an artificial satellite on an adjacent orbital plane on each of left and right in the flying direction by using the left-and-right communication device, on the plurality of orbital planes, after the monitoring satellite starts flying among the artificial satellites, reconstructs and forms the annular communication network including the monitoring satellite and also reconstructs and forms the mesh communication network, and each of the artificial satellites on each orbital plane crosses each of a northern edge of the orbital plane and a southern edge of the orbital plane in synchronization with artificial satellites on other orbital planes; when crossing the northern edge of the orbital plane, forms a communication network with an artificial satellite crossing a northern edge of an adjacent orbital plane, which is an orbital plane adjacent to the orbital plane, by the fore-and-aft communication device; and, when crossing the southern edge of the orbital plane, forms a communication network with an artificial satellite crossing a southern edge of the adjacent orbital plane, by the fore-and-aft communication device.

* * * * *